March 18, 1969     W. V. PHILLIPS     3,433,094
DUAL PATH POWER TRANSMISSION
Filed June 7, 1967
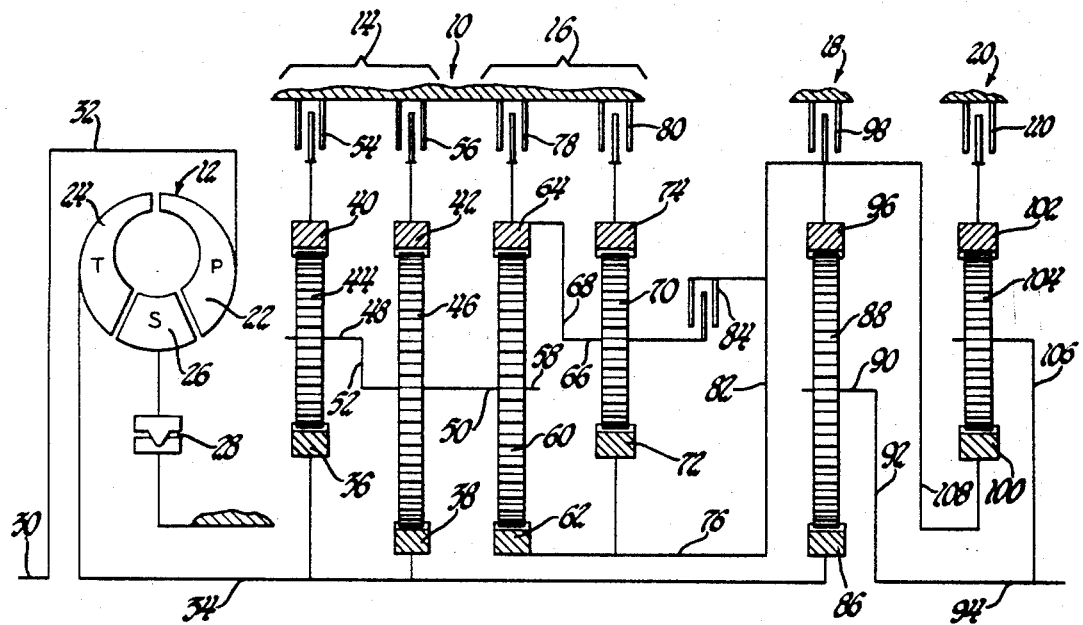
INVENTOR.
*William V. Phillips*
BY
ATTORNEY es Patent Office 3,433,094
Patented Mar. 18, 1969

3,433,094
DUAL PATH POWER TRANSMISSION
William V. Phillips, Indianapolis, Ind., assignor to General Motors Corporation, Detroit, Mich., a corporation of Delaware
Filed June 7, 1967, Ser. No. 644,131
U.S. Cl. 74—682                    8 Claims
Int. Cl. F16h 37/06

ABSTRACT OF THE DISCLOSURE

A power transmission having a plurality of dual paths of power flow is disclosed wherein a two-speed splitter planetary gear set divides the input power between a three-speed range planetary gear set and a combining planetary gear set. The splitter gear set and the range gear set are effective through the selective engagements of a plurality of torque establishing devices to provide a plurality of multi-speed split power gear trains. The combining gear set is effective to deliver the split power to a single output member.

This invention relates to variable speed transmissions and more particularly to variable speed transmissions employing a hydrodynamic torque converter and a multi-speed planetary gear split path drive arrangement. Power transmission for use in hauling vehicles and working type vehicles such as earth moving equipment must produce high starting torque and have a wide speed range within which they can operate. To provide these characteristics, a transmission having a hydrodynamic torque converter and a multi-ratio gear train is used. To reduce the overall size of components in the gearing, dual path power transmissions are used. Generally in dual path transmissions with a wide range of speed ratios, a simple planetary gear set is used as the torque splitter unit. The splitter unit provides two speed ratios. This is used in combination with a range unit which may provide three speed ratios thus giving the transmission a total of six drive ratios. One of the ratios in the splitter unit is a one-to-one drive while the other ratio is underdrive or overdrive. To change all of the overall dual path ratios, it is necessary to change the ratios of the range unit or the splitter unit and the range unit. The present invention does not have a one-to-one ratio in the splitter unit, thus, all of the overall dual path ratios can be changed by a change in the splitter unit only; if it is desired to raise or lower the existing transmission ratios.

This invention employs two interconnected planetary gear sets, having common input and common output members and individual reaction members, as a splitter unit, so that high and low splitter ratios can be selectively established. The interconnected output members of the splitter unit are connected to the input member of the range unit. The range unit provides three forward speed ratios which, when taken in combination with the two splitter speed ratios, produce an overall of six dual path forward drive ratios for the transmission. The output of the range unit and the input of the splitter unit are connected to members of the combining planetary gear set. The output of the combining planetary gear set is connected to drive the vehicle. Also, the combining planetary gear set is used to establish a single path low ratio drive.

An object of this invention is to provide an improved variable speed dual path power transmission having a torque splitter gear unit which divides power to input elements of a combining gear unit and a range unit which provides a multi-speed input to another element of the combining unit, and an output member from the combining gear unit.

Another object of this invention is to provide a dual path power transmission having two interconnected input elements of a torque splitter planetary gear unit which apportions power between a simple planetary combining set and a multi-ratio range planetary set having an input element, two reaction elements, and two interconnected output elements which are connected to drive a member of the combining gear unit, and an output member from the combining gear unit adapted to drive a vehicle.

Another object of this invention is to provide in a dual path power transmission, the combination of an input member connected to drive two sun gears of a splitter gear unit and a sun gear of a combining gear unit, two selectively controlled ring gears to provide selective drive for interconnected carrier members of the splitter unit which supply input drive for one carrier member of a range unit, a selectively controlled ring gear provides one drive to two sun gears of the range unit which are connected to a ring gear of the combining unit so that the speed of the sun gear and ring gear of the combining unit are combined to drive a carrier member of the combining unit, another selectively controlled ring gear of the range unit provides another drive for the sun gears and a selectively operable clutch member which connects the sun gears of the range unit to a carrier member of the range unit to provide a one-to-one drive in the range unit thus providing six dual path drive ratios from the input member to the carrier member of the combining gear unit which is connected to an output shaft of the transmission.

Other objects and advantages of the invention will become more fully apparent from the following description and drawing of a preferred embodiment. This drawing is a diagrammatic view of a transmission. Referring to the drawing there shown, a transmission having a housing generally designated at 10, a torque converter 12, a splitter planetary gear unit 14, a range planetary gear unit 16, a combining planetary gear unit 18, and a reverse planetary gear unit 20. The torque converter 12 has a pump 22 which drives a turbine 24 and a stator member 26 which is grounded to the transmission housing through a one-way torque establishing device 28. The pump is driven by an input shaft 30 and a rotary housing 32. The turbine 24 is drivingly connected to an input shaft 34 which is adapted to drive sun gears 36 and 38 of the splitter planetary gear unit 14. The splitter planetary gear unit also has two ring gears 40 and 42 and a plurality of pinion gears 44 meshing with ring gear 40 and sun gear 36 and a plurality of pinion gears 46 meshing with ring gear 42 and sun gear 38. The pinions 44 are rotatably mounted on a carrier member 48 while the pinions 46 are rotatably mounted on a carrier member 50. The carrier members 48 and 50 are interconnected by an annular member 52 and form the output member of the splitter unit 14. The ring gears 40 and 42 are connected to selectively operable high and low splitter unit ratio establishing devices such as a high split ratio brake 54 and a low split ratio brake 56 respectively.

The splitter unit 14 is effective to proportion the input torque between the input shaft 34 and the output members 48 and 50 of the splitter unit. The value of the torque split between the input shaft 34 and the output members 48 and 50 is determined by the selection of one of the ratio establishing devices 54 or 56.

The range gear unit 16 has a carrier member 58 which is drivingly connected to carrier member 50 and on which is rotatably mounted a plurality of pinion gears 60. The pinion gears 60 mesh with a sun gear 62 and a ring gear 64 which is connected to a carrier member 66 by an annular member 68. The carrier member 66 has rotatably mounted thereon a plurality of pinions 70 which mesh with a sun gear 72 and a ring gear 74. The sun gears 62 and 72 are interconnected by an intermediate shaft 76. The ring gears 64 and 74 may be selectively held from rotation by selectively operable high and intermediate range unit ratio establishing devices such as a high range ratio brake 78 and an intermediate range ratio brake 80 respectively. The intermediate shaft 76 is drivingly connected to a rotatable housing member 82 which may be selectively connected to carrier member 66 by a selectively operable range unit direct drive or low ratio clutch 84. The combining gear unit 18 has a sun gear 86 drivingly connected to the input shaft 34 and meshing with a plurality of pinion gears 88 which are rotatably mounted on a carrier member 90 which is drivingly connected by a hub 92 to an output shaft 94. The pinion gears 88 also mesh with a ring gear 96 which is drivingly connected to hub member 82 and a selectively operable single path low ratio establishing device such as a low brake 98. The reverse planetary gear unit 20 has a sun gear 100, a ring gear 102, and a plurality of pinions 104 meshing with the sun gear 100 and ring gear 102 and rotatably mounted on a carrier member 106. The sun gear 100 is drivingly connected by a hub 108 to the ring gear 96 of the combining gear unit. The ring gear 102 is drivingly connected to a selectively operable reverse drive ratio establishing device such as a reverse brake 110. The carrier member 106 is drivingly connected to the output shaft 94. The various ratio establishing devices and clutch shown diagrammatically in the drawing may be actuated in any known way; for example, electrically, hydraulically, pneumatically or mechanically. The operation of the transmission will now be described wherein the ratio establishing devices and the clutch 84, if not specifically referred to, are considered to be disengaged.

When none of the ratio establishing devices are engaged, the transmission is in neutral and no power is transferred from the input shaft 30 to the output shaft 94. To condition the transmission for the lowest or first forward drive ratio, ratio establishing device 98 is energized thereby preventing rotation of ring gear 96. The flow of power is from the input shaft 30 to the torque converter 12, the shaft 34, the sun gear 86 and the pinions 88. Since the ring gear 96 is restrained from rotation, the pinions walk around the inside of the ring gear carrying the carrier 90 with them thereby driving the output shaft in the same direction as the shaft 34. Clutch 84 may be engaged during this drive ratio without affecting the ratio. If the clutch 84 is engaged, a smoother transition from first to second ratio will be accomplished.

The second drive ratio is established by engaging clutch 84 and ratio establishing device 56 while ratio establishing device 98 is disengaged and the other ratio establishing devices remain disengaged. The clutch 84, when energized, connects the sun gear 72 to the carrier 66 and the sun gear 62 to the ring gear 64 thus locking up the range unit so that it is in a one-to-one or direct drive condition. This ratio will provide a dual path of power transmission from the input shaft 34 to the output shaft 94. One power path will be from the input shaft 34 through the sun gear 86, the pinions 88, carrier 90 to the output shaft 94. The other power path will be from the input shaft 34 to the sun gear 38 and pinions 46. The ring gear 42 is held from rotation by ratio establishing device 56, thus the carriers 50 and 58 are driven in the same direction as sun gear 38. The power path continues through the range gear unit 16, the hub 82, the ring gear 96, the pinions 88 and the carrier 90 to the output shaft 94. The ring gear 96 rotates in the same direction as the sun gear 86 thus causing the carrier 90 and output shaft 94 to rotate faster, at the same input speed, then they were rotated in the low ratio.

To establish the third drive ratio, the ratio establishing device 54 is engaged while the ratio establishing device 56 is disengaged and the clutch 84 remains engaged. This ratio is also a dual path ratio. One path of power flow is the same as the previous ratio from input shaft 34 through sun gear 86, pinions 88 and carrier 90 to the output shaft 94. The other power path is from input shaft 34 to sun gear 36 and planet pinions 44. The ring gear 40 is held from rotation by ratio establishing device 54. Therefore, the carrier 48 is driven in the same direction as sun gear 36, driving with it carriers 50 and 58. The range gear set is still in a one-to-one condition and, therefore, rotates at the same speed as carrier 58 driving the ring gear 96 in the same direction as sun gear 86, but driving the ring gear more rapidly than it was driven in the second speed ratio. When the ratio establishing device 54 is engaged, the carriers 48 and 50 rotate more rapidly than did the carrier 50 when the ratio establishing device 56 is engaged.

To establish the fourth forward drive ratio, ratio establishing devices 80 and 56 are engaged while ratio establishing device 54 and clutch 84 are disengaged. This ratio is also a dual path ratio. One path of power flow is the same as in the previous two dual paths; that is, from the input shaft 34 to the sun gear 86, pinions 88, carrier 90 to output shaft 94. The other power path is from input shaft 34 through sun gear 38 and pinion carrier 46. Since the ring gear 42 is held from rotation by ratio establishing device 56, the carrier 50 walks around the inside of steering gear 42 in the same direction as sun gear 38 thereby driving carrier 58 in the same direction as sun gear 38. At this point, the power flow is further split with a portion flowing from the carrier 58 to the pinions 60, the sun gear 62, intermediate member 76 to hub 82 and another portion flowing from carrier 58 to pinion 60, ring gear 64, annular member 68, carrier 66, sun gear 72, intermediate member 76 to hub 82, from hub 82 the power flows to ring gear 96 through pinion 88 and carrier 90 to the output shaft 94. During this drive ratio, the range unit 16 is an overdrive unit, that is, the output speed of the unit is higher than the input speed thus the ring gear 96 is rotated more rapidly than in the previous dual path ratios thus the output speed is higher than in the previous ratio.

To establish the fifth speed forward drive ratio, the ratio establishing device 56 is disengaged, the ratio establishing device 54 is engaged while the ratio establishing device 80 remains engaged. This is also a dual path ratio, with one power path being the same as in the previous dual path ratios; that is, from input shaft 34 through sun gear 86, pinions 88 and carrier 90 to the output shaft 94, the other power path is from input shaft 34 through sun gear 36, pinions 44 to carrier 48 since the ring gear 40 is held from rotation as previously mentioned. The carrier 48 is driven forwardly in the direction of sun gear 36, driving with it carriers 50 and 58. Here power is further divided as described for the fourth gear ratio, and continues to the output shaft the same as described for the fourth gear ratio. The speed of carriers 48 and 50 is higher in the fifth gear ratio than in the fourth gear ratio, therefore, the output speed is higher in the fifth gear ratio.

To establish the sixth forward drive ratio, ratio establishing devices 56 and 78 are energized while the ratio establishing devices 54 and 80 are deenergized. This is also a dual path ratio. One power path is the same as that previously described for the other dual path ratios; that is, from input shaft 34 to sun gear 86, planet pinions 88, carrier 90 to output shaft 94. The other power path is from input shaft 34 through sun gear 38, planet pinions 46, carriers 50 and 58, pinions 60, sun gear 62, intermediate member 76, hub 82, ring gear 96, pinions 88 and carrier 90 to the output shaft 94. In this drive ratio, the range unit 16 is also in an overdrive condition; however, the output is driven faster than it was in the fourth and fifth drive ratios thus the ring gear 96 is rotated more rapidly causing the higher output speed of the shaft 94.

A seventh forward drive ratio is established by disengaging ratio establishing device 56 and engaging ratio establishing device 54. This is also a dual path ratio, one path being the same as previously described for all dual path ratios, the other path being from input shaft 34 to sun gear 36, pinions 44, carriers 48, 50 and 58, pinions 60, sun gear 62, intermediate member 76, hub 82, ring gear 96, pinions 88, carrier 90 to output shaft 94. The carriers 48, 50 and 58 rotate more rapidly in the seventh ratio than in the sixth ratio thus causing a higher overall speed ratio in the seventh ratio than in the sixth ratio.

Reverse drive ratio is established by energizing ratio establishing device 110 and the remaining ratio establishing devices are disengaged. The power flow in reverse is from input shaft 34 to sun gear 86, pinions 88, ring gear 96, hub 108, sun 100, and pinions 104 to carrier 106 which is forced to walk around the inside of ring gear 102. Since the ring gear 102 is held from rotation by the ratio establishing device 110, the pinions 104 are forced to walk around the inside of the ring gear 102 carrying with them the carrier member 106 thus driving the output shaft 94 due to initial resistance of the vehicle that carries carrier 90 to stationary. Therefore, the ring gear 96 rotates opposite to the sun gear 86 driving the sun 100, carrier 106, and output shaft 94 in a direction opposite to input shaft 34 and sun gear 86. The clutch 84 may also be engaged during the reverse drive without affecting the overall ratio of the transmission.

Thus a dual path transmission having seven forward speeds and one reverse is provided. Six of the forward speeds are of the dual path type, the advantages of which provide the use of smaller components in the splitter unit 10 and the range unit 16 than could be used if these planetary gear units had to transmit full input torque instead of just a portion thereof.

Many modifications and variations are possible in light of the above teachings. It is, therefore, to be understood within the scope of the appended claims, the invention may be practiced otherwise than as specifically described.

What is claimed is:

1. A dual path power transmission having input means; an output member; torque splitter planetary gear means having a splitter input element operatively connected to said input means to provide an input drive to said torque splitter planetary gear means, a splitter output element and gear means interconnecting said splitter input and output elements having a plurality of splitter ratio drive establishing means for establishing a plurality of splitter drive ratios other than one-to-one; range planetary gear means having a range input element operatively connected to said splitter output element, a range output element and gear means interconnecting said range input and output elements having a plurality of range ratio drive establishing means for establishing a plurality of ratio drives between said range input and output elements; a torque combiner planetary gear set having a combiner input element operatively connected to said input means for one input drive, another combiner input element operatively connected to said range output element for another input drive and a combiner output element operatively connected to said output member to provide an output drive.

2. A dual path power transmission comprising input means; an intermediate member; an output member; a torque splitter planetary gear unit including a plurality of input elements drivingly connected to said input means, a plurality of interconnected output elements, and a plurality of reaction elements for determining the proportion of torque split between said input elements and said output elements; a range planetary gear unit including an input element drivingly connected to said torque splitter output elements, a plurality of reaction elements, a plurality of interconnected output elements drivingly connected to said intermediate member, another element connected to one of said reaction elements, and clutch means selectively operable to connecting said other element to said output elements; a combiner planetary gear set having an input element operatively connected to said input means, another input element operatively connected to said intermediate member, and an output element operatively connected to said output member; ratio drive establishing means selectively operatively connected to each of said reaction elements in said torque splitter planetary gear unit and said range planetary gear unit, said ratio drive establishing means and said clutch means being selectively operable to provide a plurality of dual paths of power transmission from said input means to said output member.

3. The invention defined in claim 2 and said input means including a torque converter and an input shaft; said torque converter having an input element adapted to be drivingly connected to a power source, an output element drivingly connected to said input shaft and a reaction member.

4. A dual path power transmission having input means; an intermediate member; an output member; a torque splitter planetary gear unit including two input elements drivingly connected to said input means, two interconnected output elements and two reaction elements each having selectively operable ratio drive establishing means for determining the value of torque split between said input elements and said output elements; a range planetary gear unit including an input element connected to said output elements of said torque splitter planetary gear unit, two reaction elements each having selectively operable ratio drive establishing means, two interconnected output elements drivingly connected to said intermediate member, an element connected to one of said reaction elements and clutch means selectively operable to connect said element to said output elements of the range planetary gear unit; and a combiner planetary gear unit including an input element connected to said input means, an output element connected to said output member, another element connected to said intermediate member and ratio drive establishing means selectively operative to prevent rotation of said other element.

5. The invention defined in claim 4 and said input means including a torque converter and an input shaft; said torque converter having an input element adapted to be drivingly connected to a power source, an output element drivingly connected to said input shaft and a reaction member.

6. A dual path power transmission comprising input means, an intermediate member, an output member, a torque splitter planetary gear unit, a range planetary gear unit and a combiner planetary gear unit; said torque splitter having two sun gears drive connected to said input means, two ring gears, two interconnected carrier members having pinions rotatably mounted thereon, said pinions on one of said carriers meshing with one of said sun and ring gears, said pinions on the other of said carriers meshing with the other of said sun and ring gear, and brake means connected to each of said ring gears selectively operable to prevent rotation thereof; said range planetary gear unit having two sun gears drivingly connected to said intermediate member; a first and second ring gear, a first carrier having pinions rotatably mounted thereon meshing with one of said sun gears and said first ring gear and being drivingly connected to said carriers of said torque splitter planetary gear unit, a second carrier having pinions rotatably mounted thereon meshing with another of said sun gears and said second ring gear and being drivingly connected to said first ring gear, clutch means selectively operable to connect said second carrier to said sun gears and brake means for each of said first and second ring gears selectively operable to prevent rotation thereof; said combiner planetary gear set having a sun gear drivingly connected to said input means, a ring gear drivingly connected to said intermediate member, a carrier having pinions rotatably mounted thereon meshing with said sun and ring gears, said carrier being drivingly connected to said output member and brake means connected to said ring gear selectively operable to prevent rotation thereof; said clutch and brake means being effective when operated to provide a plurality of dual paths of power transmission from the input means to the output member.

7. The invention defined in claim 6 and said input means including a torque converter and an input shaft; said torque converter having an input element adapted to be drivingly connected to a power source, an output element drivingly connected to said input shaft and a reaction member.

8. The invention defined in claim 7 and further including a reverse planetary gear unit having a sun gear, a ring gear, a carrier drivingly connected to said output member, and a plurality of pinions rotatably mounted on said carrier and meshing with said sun and ring gears; brake means operatively connected to said ring gear to selectively prevent rotation thereof; and hub means drivingly connecting said sun gear to the ring gear of said combiner planetary gear set.

References Cited

UNITED STATES PATENTS

| | | | |
|---|---|---|---|
| 2,159,427 | 5/1939 | Dunn | 74—759 |
| 2,519,022 | 8/1950 | Burtnett | 74—688 |
| 2,645,135 | 7/1953 | Frank | 74—682 |
| 2,799,184 | 7/1957 | Miller | 74—759 |
| 2,939,341 | 6/1960 | Evernden | 74—682 |
| 3,096,666 | 7/1963 | Christenson et al. | 74—765 X |
| 3,097,544 | 7/1963 | Evernden | 74—688 |
| 3,267,769 | 8/1966 | Tuck et al. | 74—759 |

ARTHUR T. McKEON, *Primary Examiner.*

U.S. Cl. X.R.

339—221, 258